United States Patent
Bergström et al.

(10) Patent No.: US 12,441,599 B2
(45) Date of Patent: Oct. 14, 2025

(54) METHOD, A MANAGEMENT SYSTEM AND A MOBILE HYDROGEN REFUELLING SYSTEM

(71) Applicant: Volvo Construction Equipment AB, Eskilstuna (SE)

(72) Inventors: Johanna Bergström, Gothenburg (SE); Roland Kvist, Braås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 104 days.

(21) Appl. No.: 18/373,407

(22) Filed: Sep. 27, 2023

(65) Prior Publication Data
US 2024/0132338 A1 Apr. 25, 2024
US 2024/0228259 A9 Jul. 11, 2024

(30) Foreign Application Priority Data

Oct. 20, 2022 (EP) .................................... 22202735

(51) Int. Cl.
*B67D 7/04* (2010.01)
*B60P 3/22* (2006.01)
(Continued)

(52) U.S. Cl.
CPC ............. *B67D 7/0401* (2013.01); *B60P 3/22* (2013.01); *F17C 5/06* (2013.01); *G01C 21/343* (2013.01);
(Continued)

(58) Field of Classification Search
CPC .................. B67D 7/04; B67D 7/0401; B67D 2007/0442; G01C 21/343; G01C 21/3438; G06Q 10/047; G06Q 10/06312; G06Q 50/40; B60P 3/22; F17C 2221/012; F17C 2250/032; F17C 2250/034;
(Continued)

(56) References Cited

U.S. PATENT DOCUMENTS 10,046,962 B2 * 8/2018 Hall .......................... B67D 7/04
2017/0362076 A1 * 12/2017 Hall ........................ H04W 4/44
(Continued)

FOREIGN PATENT DOCUMENTS

GB 2529181 A * 2/2016 ......... F02D 41/0025

OTHER PUBLICATIONS

Extended European Search Report for European Patent Application No. 22202735.1, mailed Mar. 20, 2023, 8 pages.

*Primary Examiner* — Nicolas A Arnett
(74) *Attorney, Agent, or Firm* — Sage Patent Group

(57) ABSTRACT

A computer-implemented method for managing a mobile hydrogen refuelling system includes obtaining from a hydrogen refuelling vehicle a first set of data relating to the hydrogen refuelling vehicle, obtaining from a hydrogen supply vehicle a second set of data relating to the hydrogen supply vehicle, in the management system, obtaining map data relating to an area of operation of said hydrogen refuelling vehicle and said hydrogen supply vehicle, determining a resupply location based on said first set of data, said second set of data and said map data, and providing the hydrogen refuelling vehicle and/or the hydrogen supply vehicle with navigation instructions to the resupply location for resupplying the hydrogen refuelling vehicle with hydrogen from the hydrogen supply vehicle.

13 Claims, 4 Drawing Sheets

(51) Int. Cl.
*F17C 5/06* (2006.01)
*G01C 21/34* (2006.01)
*G06Q 10/047* (2023.01)
*G06Q 10/0631* (2023.01)
*G06Q 50/40* (2024.01)

(52) U.S. Cl.
CPC ....... *G01C 21/3438* (2013.01); *G06Q 10/047* (2013.01); *G06Q 10/06312* (2013.01); *G06Q 50/40* (2024.01); *B67D 2007/0442* (2013.01); *F17C 2221/012* (2013.01); *F17C 2250/032* (2013.01); *F17C 2250/034* (2013.01); *F17C 2250/0478* (2013.01); *F17C 2265/065* (2013.01); *F17C 2270/0168* (2013.01); *Y02E 60/32* (2013.01)

(58) Field of Classification Search
CPC ........ F17C 2250/0478; F17C 2265/065; F17C 2270/0168; Y02E 60/32
See application file for complete search history.

(56) References Cited

U.S. PATENT DOCUMENTS

| | | | |
|---|---|---|---|
| 2018/0075567 A1* | 3/2018 | Mycroft | B67D 7/0401 |
| 2018/0300823 A1* | 10/2018 | Aubuchon | G06Q 20/322 |
| 2021/0199451 A1* | 7/2021 | Murata | F17C 5/06 |
| 2021/0245719 A1* | 8/2021 | Hall | G07C 5/0808 |
| 2021/0387540 A1* | 12/2021 | Ohmori | B60K 35/22 |
| 2022/0136655 A1* | 5/2022 | Pollica | B67D 7/80 |
| 2022/0281422 A1* | 9/2022 | Jourdy | G06Q 50/06 |
| 2022/0349723 A1* | 11/2022 | Lee | G01C 21/3476 |
| 2022/0359891 A1* | 11/2022 | Lee | G06Q 10/04 |
| 2023/0326257 A1* | 10/2023 | Shinzaki | F17C 13/02 |
| | | | 701/31.4 |

* cited by examiner

METHOD, A MANAGEMENT SYSTEM AND A MOBILE HYDROGEN REFUELLING SYSTEM

CROSS REFERENCE TO RELATED APPLICATION

This application claims foreign priority to European Application No. 22202735.1 filed on Oct. 20, 2022, the disclosure and content of which is incorporated by reference herein in its entirety.

TECHNICAL FIELD

The present disclosure relates to the field of hydrogen fuel infrastructure, more specifically it relates to a computer-implemented method for managing a mobile hydrogen refuelling system. The disclosure also relates to a management system, a computer program product, a non-transitory computer-readable storage medium and a mobile hydrogen refuelling system arranged to perform the method.

BACKGROUND

An infrastructure for supporting and refuelling hydrogen-consuming applications is lacking today. Mobile hydrogen refuelling stations (MHRS) exist to complement fixed refuelling stations.

A MHRS is generally a vehicle with a dispenser, a compressor, and a high-pressure storage for hydrogen, which is able to refuel hydrogen-consuming applications. However, the amount of hydrogen on the MHRS is limited and a hydrogen supply vehicle (HSV) is needed to support the MHRS with additional hydrogen. A HSV is usually a low-pressure hydrogen storage of substantial capacity mounted on a vehicle or trailer. The MHRS and the HSV need to physically dock with each other to enable replenishment of the hydrogen storage of the MHRS. This may be a time-consuming operation, where either the MHRS or the HSV needs to spend considerable time waiting for the other party to arrive at a refuelling site.

There is thus a need to improve on today's hydrogen refuelling infrastructure.

SUMMARY

In view of the above, an object of the disclosure is to provide an in at least some aspect improved mobile refuelling infrastructure. In particular, an object of the disclosure is to provide an improved method for managing a mobile hydrogen refuelling system. Further objects of the disclosure are to provide an improved management system, an improved computer program product, an improved non-transitory computer-readable storage medium, and an improved hydrogen refuelling system for performing such a method.

According to a first aspect of the disclosure the object is at least partly achieved by a computer-implemented method according to claim 1.

Hence, there is provided a method for managing a mobile hydrogen refuelling system. The mobile hydrogen refuelling system comprises a hydrogen refuelling vehicle, a hydrogen supply vehicle, and a management system. The method comprises, in the management system, obtaining from the hydrogen refuelling vehicle a first set of data relating to the hydrogen refuelling vehicle. Further, in the management system, obtaining from the hydrogen supply vehicle a second set of data relating to the hydrogen supply vehicle, and in the management system, obtaining map data relating to an area of operation of the hydrogen refuelling vehicle and the hydrogen supply vehicle. Yet further, in the management system, determining a resupply location based on the first set of data, the second set of data and the map data, and providing the hydrogen refuelling vehicle and/or the hydrogen supply vehicle with navigation instructions to the resupply location for resupplying the hydrogen refuelling vehicle with hydrogen from the hydrogen supply vehicle.

Resupplying, or a resupply operation, is herein to be understood as a process of replenishing a hydrogen storage of the hydrogen refuelling vehicle. Such a process may include travelling to a resupply location.

Refuelling, or a refuelling operation, is herein to be understood as a process of refuelling an object by the hydrogen refuelling vehicle. Such an object may be a hydrogen-consuming application, such as a vehicle, a vessel and/or a fixed installation, e.g. a hydrogen-fueled machine. The process may include travelling to a refuelling location.

The method may involve a plurality of hydrogen refuelling vehicles and hydrogen supply vehicles. Typically, for each hydrogen refuelling vehicle, a plurality of hydrogen supply vehicles may be available for receiving navigation instructions for resupplying a particular hydrogen refuelling vehicle. In such a case, the method comprises analysing in the management system the first set of data and the second set of data and the map data to select a hydrogen supply vehicle, out of available hydrogen supply vehicles, which is capable of resupplying the hydrogen refuelling vehicle in the most time-efficient manner for receiving the navigation instructions to the resupply location for resupplying the hydrogen refuelling vehicle.

The first set of data, the second set of data and the map data are analysed together in order to determine the resupply location for resupplying the hydrogen refuelling vehicle. Usually, such a location would be determined to optimise, or minimise, a time required for resupplying the hydrogen refuelling vehicle.

Optionally, the resupply location is determined as the location requiring the shortest time to resupply the hydrogen refuelling vehicle, out of available resupply locations obtained from said map data.

The time required for resupplying the hydrogen refuelling vehicle may be defined as the time required by the hydrogen refuelling vehicle to resupply/replenish its hydrogen storage and to travel to the resupply location, i.e. the time spent for a resupply operation instead of pursuing a schedule of refuelling operations. Time spent to travel to the resupply location is only relevant if travel to the resupply location requires a longer travelling time to reach the destination, i.e. the location of the object to be refuelled, than the originally planned route. Time spent by the hydrogen refuelling vehicle to wait for the hydrogen supply vehicle may also be considered "time required for resupplying the hydrogen refuelling vehicle".

An available resupply location is herein defined as a location offering enough maneuverability for the hydrogen refuelling vehicle and the hydrogen supply vehicle involved in the resupply operation to dock and fluidly connect with each other to carry out the resupply operation. The available resupply locations may be a pre-determined set of locations comprised in the map data. The available resupply locations may alternatively be determined by analysis of the map data, such as analysis of road and terrain features and facilities such as truck stops, gas stations, etc.

Optionally, the first set of data comprises information relating to location, predicted time for required resupply, travelling path, and/or amount of required hydrogen of the hydrogen refuelling vehicle. The second set of data may comprise information relating to location and/or hydrogen level of the hydrogen supply vehicle.

Optionally, the map data comprises data relating to geographic features, topography, roads, routes, real-time traffic data, and/or facilities, such as gas stations, parking spaces, truck stops, etc.

Using such data, the management system is able to analyse the first set of data and the second set of data and the map data to provide the hydrogen refuelling vehicle and the hydrogen supply vehicle with navigation instructions to a resupply location, which enables a time-efficient resupply operation.

Optionally, the first set of data further comprises information relating to scheduled refuelling operations of the hydrogen refuelling vehicle. The information relating to scheduled refuelling operations of the hydrogen refuelling vehicle may comprise predicted location, time required for refuelling, and/or predicted amount of hydrogen fuel of at least one object to be refuelled by the hydrogen refuelling vehicle.

The hydrogen refuelling vehicle may have a list of scheduled refuelling operations for refuelling objects, i.e. hydrogen-consuming applications, such as vehicles, vessels and/or fixed installations, e.g. hydrogen-fueled machines. The list of scheduled refuelling operations may require the hydrogen supply vehicle to intercept the hydrogen refuelling vehicle on a scheduled route of the hydrogen refuelling vehicle. The inclusion of such a schedule in the first set of data may improve optimisation of the time required to resupply the hydrogen refuelling vehicle.

Optionally, the method may further comprise, in the management system, updating the information relating to scheduled refuelling operations such that refuelling operations are re-scheduled to provide a resupply location which reduces a total time required for resupplying the hydrogen refuelling vehicle and for performing at least two consecutive refuelling operations according to the re-scheduled refuelling operations compared to the total time required for resupplying the hydrogen refuelling vehicle and for performing the originally scheduled refuelling operations.

Accordingly, the travelling path of the hydrogen refuelling vehicle, the location of the hydrogen supply vehicle, the map data, and information relating to at least two consecutive refuelling operations may be significant when providing the hydrogen refuelling vehicle and the hydrogen supply vehicle with navigation instructions to the resupply location for resupplying the hydrogen refuelling vehicle. The information relating to scheduled refuelling operations may show that the total time required for a resupply operation and at least two consecutive refuelling operations may be reduced if the at least two refuelling operations were re-scheduled, such that a required resupply operation could be carried out more efficiently. In such a case the management system may be configured to update the information relating to scheduled refuelling operations, to re-schedule at least two refuelling operations. As an example, if the hydrogen refuelling vehicle requires replenishment of its hydrogen storage and object A is scheduled for refuelling, followed by object B, but object B is much closer to the hydrogen refuelling vehicle and/or the hydrogen supply vehicle, the schedule may be updated to enable resupply of the hydrogen refuelling vehicle more conveniently, e.g. requiring less travel, and to refuel object B before object A.

Optionally, the information relating to scheduled refuelling operations comprises prioritisation data of objects to be refuelled by the hydrogen refuelling vehicle, which prioritisation data enables the management system to determine whether the at least two consecutive refuelling operations are allowed to be re-scheduled.

Since some objects, which are scheduled for refuelling, may be higher prioritised than others, the prioritisation data allows such prioritised objects to keep their position among the scheduled refuelling operations even if the total time required for a resupply operation of the hydrogen refuelling vehicle, the refuelling operation of the prioritised object and at least one subsequent refuelling operation would be reduced if the refuelling operations were re-scheduled. In this manner it is ensured that prioritised objects are not required to wait longer than necessary for refuelling.

According to a second aspect of the disclosure the object is at least partly achieved by a management system according to claim 9.

Hence, there is provided a management system for controlling a mobile hydrogen refuelling system. The management system comprises a processor device and a communications device configured to perform the method according to any one of the embodiments of the first aspect of the disclosure.

The management system may comprise processing and communications capability in the form of at least one processing device and at least one communications device to enable obtaining the first set of data and the second set of data from the hydrogen refuelling vehicle and from the hydrogen supply vehicle, respectively. The management system, i.e. the processing device and the communications device, may further be physically separately located from each vehicle involved in the method, such as being located in a central fixed location. Alternatively, it may be located in one of the vehicles, such as in a hydrogen refuelling vehicle serviced by one or more hydrogen supply vehicles. The management system may further be configured to provide the hydrogen refuelling vehicle and/or the hydrogen supply vehicle with navigation instructions to the resupply location for resupplying the hydrogen refuelling vehicle with hydrogen from the hydrogen supply vehicle.

According to a third aspect of the disclosure, the object is at least partly achieved by a computer program product according to claim 10.

Hence there is provided a computer program product comprising program code for performing the method of any one of the of the embodiments of the first aspect of the disclosure when said program is run on the processor device of the management system of any one of the embodiments of the second aspect of the disclosure.

According to a fourth aspect of the disclosure, the object is at least partly achieved by a computer-readable storage medium according to claim 11.

Hence, there is provided a non-transitory computer-readable storage medium comprising instructions, which when executed by the processor device of the management system of the second aspect of the disclosure, cause the processor device to perform the method of any one of the embodiments of the first aspect of the disclosure.

According to a fifth aspect of the disclosure, the object is at least partly achieved by a mobile hydrogen refuelling system according to claim 12.

Hence, there is provided a mobile hydrogen refuelling system for resupplying a hydrogen refuelling vehicle. The system comprises at least one hydrogen refuelling vehicle, at least one hydrogen supply vehicle, and the management system according to any one of the embodiments of the second aspect of the disclosure.

Optionally, the hydrogen refuelling vehicle is configured to communicate the first set of data to the management system. The hydrogen supply vehicle may be configured to communicate the second set of data to the management system. The management system may be configured to provide the hydrogen refuelling vehicle and/or the hydrogen supply vehicle with navigation instructions to the resupply location for resupplying the hydrogen refuelling vehicle with hydrogen from the hydrogen supply vehicle.

Optionally, the hydrogen refuelling vehicle and the hydrogen supply vehicle comprise onboard navigation units, monitoring units and/or communication units configured to collect and communicate the first set of data and the second set of data, respectively, and to receive navigation instructions to the resupply location for resupplying the hydrogen refuelling vehicle with hydrogen from the hydrogen supply vehicle.

Optionally, the mobile hydrogen refuelling system further comprises a predetermined set of objects scheduled to be refuelled by the hydrogen refuelling vehicle.

Optionally, the predetermined set of objects comprise hydrogen-driven vehicles, vessels and/or fixed machines.

Advantages and/or advantageous features of the second, third, fourth and the fifth aspects of the disclosure largely correspond to the advantages and/advantageous features discussed in relation to the first aspect of the disclosure.

BRIEF DESCRIPTION OF THE DRAWINGS

Further objects and advantages of, and features of the disclosure will be apparent from the following description of one or more embodiments, with reference to the appended drawings, where.

DETAILED DESCRIPTION OF EXAMPLE EMBODIMENTS OF THE DISCLOSURE

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

An infrastructure of fixed installations for refuelling hydrogen consumers, such as vehicles, vessels and fixed machines which are powered by hydrogen, is today lacking or insufficient. Development of hydrogen-driven applications cannot gain momentum until a reliable infrastructure is established. A way of improving the infrastructure is to provide mobile hydrogen refuelling stations which are able to carry limited amounts of hydrogen, which is stored on board either in cooled liquid phase, as compressed gas or as cryo-compressed gas (liquid phase). For a system of mobile hydrogen refuelling stations to be efficient, the mobile hydrogen refuelling stations should not be required to return to a fixed resupply station when an on-board hydrogen storage is depleted. Instead, hydrogen supply vehicles are envisioned to service the mobile hydrogen refuelling stations and to provide resupply opportunities for the mobile hydrogen refuelling vehicles in their areas of operation.

Figure 1:
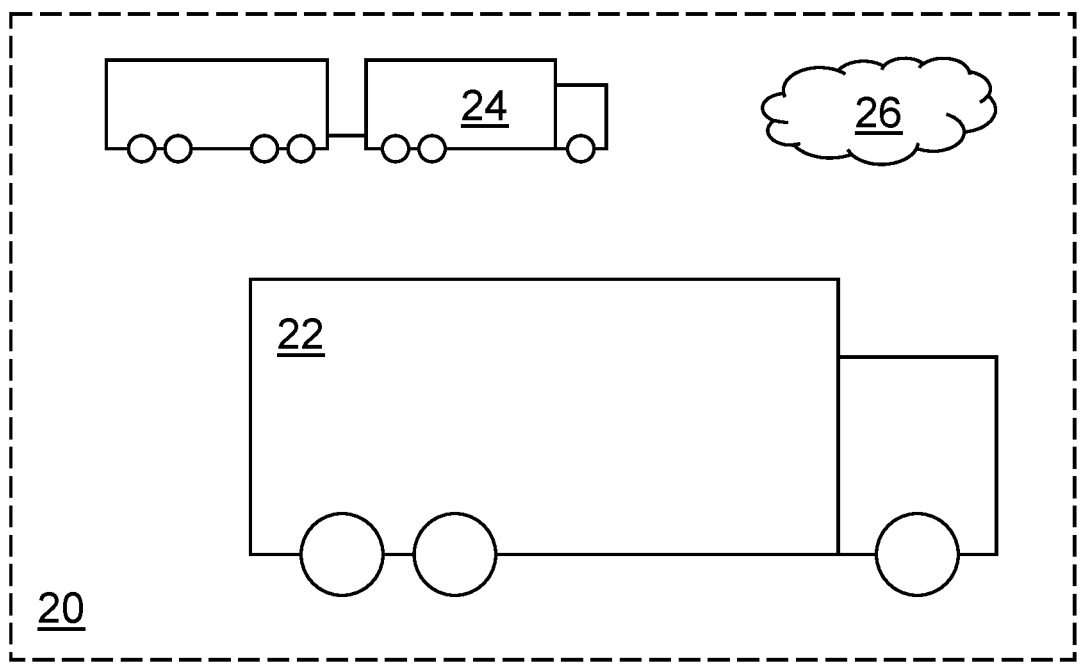
FIG. 1 conceptually shows basic constituents of a mobile hydrogen refuelling system according to an aspect of the disclosure.
Figure 2:
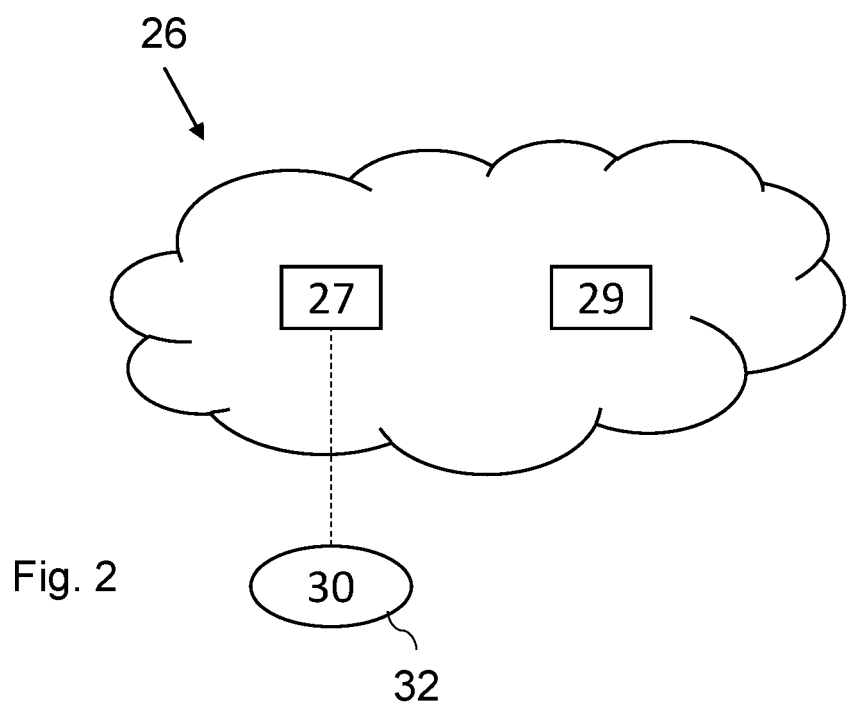
FIG. 2 shows a management system according to an aspect of the disclosure.

FIG. 1 shows a concept of a mobile hydrogen refuelling system 20 for resupplying a mobile hydrogen refuelling station, herein named hydrogen refuelling vehicle 22. The mobile hydrogen refuelling system 20 comprises at least one hydrogen refuelling vehicle 22, at least one hydrogen supply vehicle 24, and a management system 26. The hydrogen refuelling vehicle 22 may comprise a high-pressure hydrogen storage, whereas the hydrogen supply vehicle 24 comprises a low-pressure hydrogen storage with a storage capacity significantly larger than the hydrogen refuelling vehicle 22. The management system 26 is configured to control the hydrogen refuelling system 20 to enable mobile resupply of the hydrogen refuelling vehicle 22 with hydrogen by the hydrogen supply vehicle 24. To this end, the management system 26 may comprise a processor device 27 and a communications device 29, as shown in FIG. 2.

There is thus provided a mobile hydrogen refuelling system 20 which enables efficient resupply of any hydrogen refuelling vehicles 22 comprised in the system 20. The hydrogen refuelling vehicle 22 is configured to communicate a first set of data to the management system 26. The hydrogen supply vehicle 24 is configured to communicate a second set of data to the management system 26. The management system 26 is in turn configured to obtain map data and to provide the hydrogen refuelling vehicle 22 and/or the hydrogen supply vehicle 24 with navigation instructions to a resupply location 23, based on the first set of data, the second set of data and the map data. The resupply location 23 is thereafter used by the hydrogen refuelling vehicle 22 and the hydrogen supply vehicle 24 as a common navigational destination where the hydrogen refuelling vehicle 22 may dock with, and fluidly connect with hydrogen supply vehicle 24 to be resupplied with hydrogen.

The hydrogen refuelling vehicle 22 and the hydrogen supply vehicle 24 may comprise onboard navigation units, monitoring units and/or communication units (not shown) configured to collect and communicate the first set of data and the second set of data, respectively, and to receive the navigation instructions to the resupply location 23 for resupplying the hydrogen refuelling vehicle 22 with hydrogen from the hydrogen supply vehicle 24.

Figure 3:
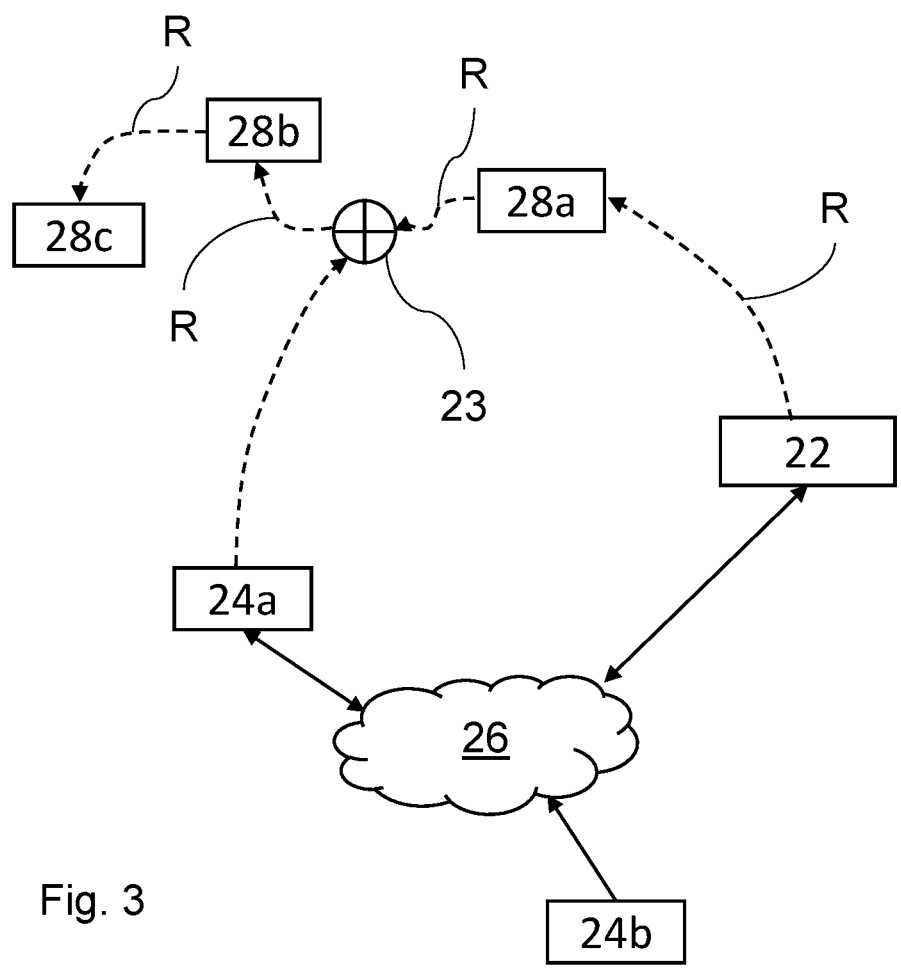
FIG. 3 conceptually shows management of the hydrogen refuelling system according to an aspect of the disclosure.

FIG. 3 conceptually shows communication of the first set of data and the second set of data to the management system 26 from the hydrogen refuelling vehicle 22 and from two hydrogen supply vehicles 24a, 24b, respectively. Optionally, the mobile hydrogen refuelling system 20 may further comprise a predetermined set of objects 28 scheduled to be refuelled by the hydrogen refuelling vehicle 22. As discussed above, the set of objects 28 to be refuelled may comprise hydrogen consumers, such as vehicles, vessels and fixed machines which are powered by hydrogen. In FIG. 3, three objects 28a, 28b, 28c are illustrated. The management system 26 analyses the first set of data, the second set of data and the map data and provides the hydrogen refuelling vehicle 22 and one of the hydrogen supply vehicles 24a with navigation instructions to the resupply location 23. The hydrogen refuelling vehicle 22 and the hydrogen supply vehicle 24a follow the navigation instructions to the refuelling location 23. As shown, the refuelling location 23 may be determined in relation to planned refuelling operations of the hydrogen refuelling vehicle 22 such the refuelling location 23 is on, or near, a planned route R of the hydrogen refuelling vehicle 22 for refuelling objects 28*a*, 28*b*, 28*c*. Obviously, if the most advantageous refuelling location 23 is determined to be near the originally planned route, the planned route R may be updated to comprise the refuelling location 23. The most advantageous refuelling location 23 is usually the location requiring the shortest resupply time of the hydrogen refuelling vehicle 22. The resupply time is to be understood as time used by the hydrogen refuelling vehicle 22 for resupplying its hydrogen storage instead of pursuing refuelling operations.

Figure 4:
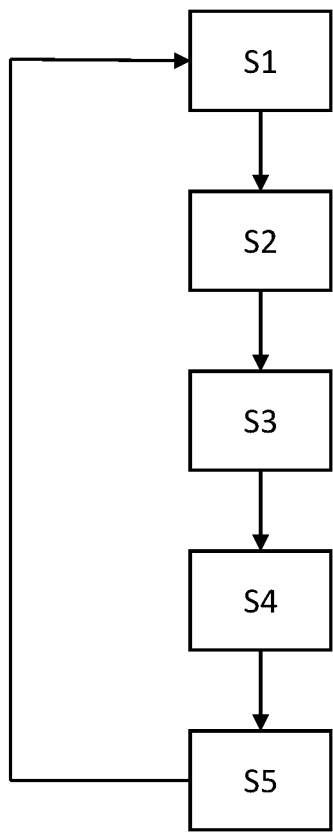
FIG. 4 shows a flowchart of a method according to an aspect of the disclosure.

As illustrated by the flowchart of FIG. 4, there is provided a computer implemented method 10 for managing the mobile hydrogen refuelling system 20. As mentioned above, the mobile hydrogen refuelling system 20 comprises at least the hydrogen refuelling vehicle 22, the hydrogen supply vehicle 24, and the management system 26. The method comprises the following actions performed in the management system 26, which actions may be taken in any suitable order unless indicated otherwise:

S1: obtaining from the hydrogen refuelling vehicle 22 a first set of data relating to the hydrogen refuelling vehicle 22, S2: obtaining from the hydrogen supply vehicle 24 a second set of data relating to the hydrogen supply vehicle 24, S3: obtaining map data relating to an area of operation of said hydrogen refuelling vehicle 22 and said hydrogen supply vehicle 24, S4: determining a resupply location based on said first set of data, said second set of data and said map data, and S5: providing S5 the hydrogen refuelling vehicle 22 and/or the hydrogen supply vehicle 24 with navigation instructions to the resupply location 23 for resupplying the hydrogen refuelling vehicle 22 with hydrogen from the hydrogen supply vehicle 24.

The method 10 may involve a plurality of hydrogen refuelling vehicles 22 and hydrogen supply vehicles 24. Typically, for each hydrogen refuelling vehicle 22, a plurality of hydrogen supply vehicles 24 may be available for receiving navigation instructions for resupplying the hydrogen refuelling vehicle 22 in question. In such a case, the method 10 may comprise the action of analysing S7, in the management system 26, the first set of data and the second set of data and the map data to select a hydrogen supply vehicle 24, out of available hydrogen supply vehicles 24, which is capable of resupplying the hydrogen refuelling vehicle 22 in the most time-efficient manner for receiving the navigation instructions to the resupply location 23 for resupplying the hydrogen refuelling vehicle 22.

The first set of data, the second set of data and the map data are analysed together in order to determine the resupply location 23 for resupplying the hydrogen refuelling vehicle 22. Usually, such a resupply location 23 would be determined to optimise, or minimise, a time required for resupplying the hydrogen refuelling vehicle 22. In other words, the resupply location may be determined as the location requiring the shortest time to resupply the hydrogen refuelling vehicle, out of available resupply locations obtained from the map data. Preferably, the resupply location 23 would be determined on, or near, a planned route of the hydrogen refuelling vehicle 22 in order to minimise time-consuming detours for the hydrogen refuelling vehicle 22. However, occasionally, time may be saved by updating the planned route to meet with the hydrogen supply vehicle 24 away from the originally planned route.

The first set of data may comprise information relating to location, predicted time for required resupply, travelling path/planned route, and/or amount of required hydrogen of the hydrogen refuelling vehicle 22. The second set of data may comprise information relating to location and/or hydrogen level of the hydrogen supply vehicle 24. The map data may comprise data relating to geographic features, topography, roads, routes, real-time traffic data, and/or facilities, such as gas stations, parking spaces, truck stops, etc.

The management system 26 is configured to analyse the first set of data and the second set of data and the map data to determine the resupply location 23 and to provide the hydrogen refuelling vehicle 22 and the hydrogen supply vehicle 24 with navigation instructions to the resupply location 23, which enables a time-efficient resupply operation, as discussed above.

The hydrogen refuelling vehicle 22 may be allocated to a geographic region or to a set of objects 28 to be refuelled. Therefore, the first set of data may comprise information relating to scheduled refuelling operations of the hydrogen refuelling vehicle 22, i.e. to information relating to objects 28 to be refuelled by the refuelling vehicle 22. The information relating to scheduled refuelling operations of the hydrogen refuelling vehicle 22 may comprise predicted location, time required for refuelling, and/or predicted amount of hydrogen fuel of at least one object 28 to be refuelled by the hydrogen refuelling vehicle 22.

The hydrogen refuelling vehicle 22 may have a list of scheduled refuelling operations for refuelling objects 28, i.e. hydrogen-consuming applications, such as vehicles, vessels and/or fixed installations, e.g. hydrogen-fueled machines. The list of scheduled refuelling operations may require the hydrogen supply truck 24 to intercept the hydrogen refuelling vehicle 22 on a scheduled/planned route of the hydrogen refuelling vehicle 22. The inclusion of such a schedule in the first set of data may improve optimisation/minimisation of the time required to resupply the hydrogen refuelling vehicle 22.

Figure 5:
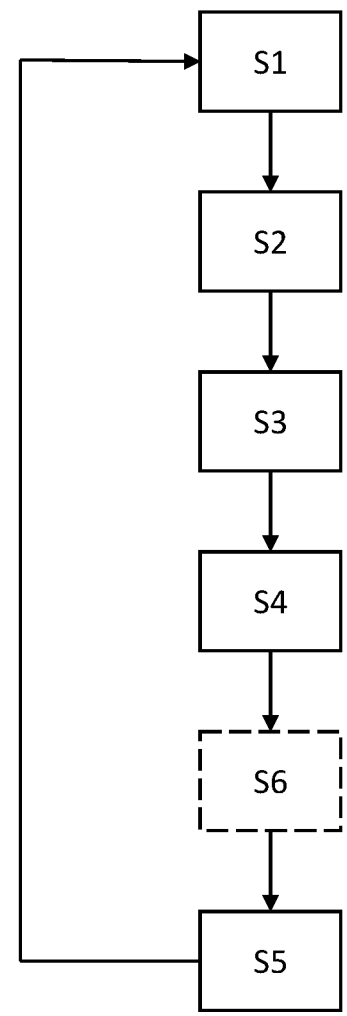
FIG. 5 shows a flowchart of a method according to an alternative embodiment of the method of FIG. 2.

As shown in the flowchart of FIG. 5, the method 10 may further comprise, in the management system 26, updating S6 the information relating to scheduled refuelling operations such that refuelling operations are re-scheduled to provide a resupply location 23 which reduces a total time required for resupplying the hydrogen refuelling vehicle 22 and for performing at least two consecutive refuelling operations according to the re-scheduled refuelling operations compared to the total time required for resupplying the hydrogen refuelling vehicle 22 and for performing the originally scheduled refuelling operations.

The travelling path or planned route of the hydrogen refuelling vehicle 22, the location of the hydrogen supply vehicle 24, the map data, and information relating to at least two consecutive refuelling operations may be used when providing the hydrogen refuelling vehicle 22 and the hydrogen supply vehicle 24 with navigation instructions to the resupply location 23 for resupplying the hydrogen refuelling vehicle 24. The information relating to scheduled refuelling operations may show that the total time required by the hydrogen refuelling vehicle 22 to perform a resupply operation and at least two consecutive refuelling operations may be reduced if the at least two refuelling operations are re-scheduled, such that a required resupply operation may be carried out more efficiently. In such a case the management system 26 may be configured to update the information relating to scheduled refuelling operations, to re-schedule at least two refuelling operations to enable a quicker resupply operation for the hydrogen refuelling vehicle 22.

Figure 6:
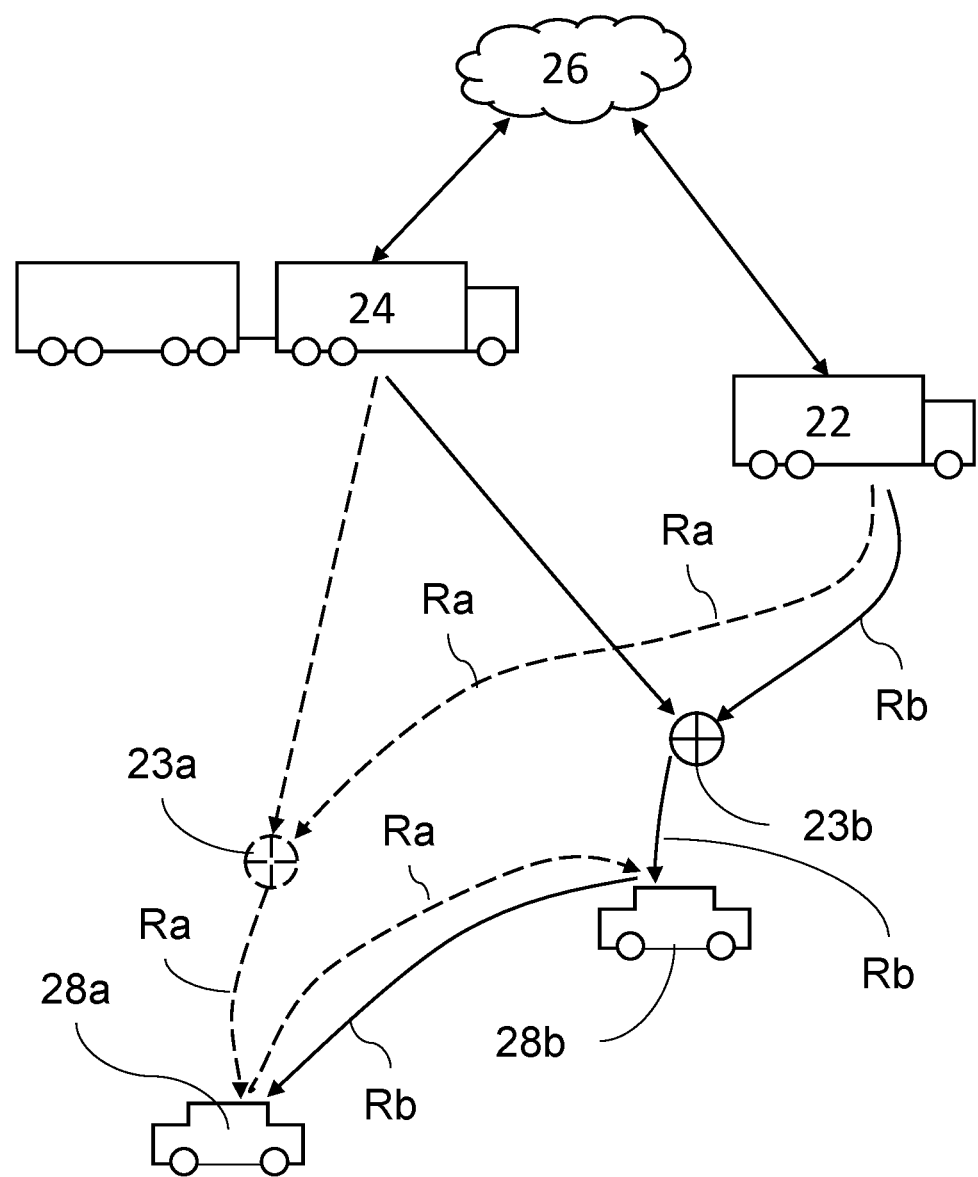
FIG. 6 shows route planning according to the alternative embodiment shown in FIG. 5.

An example illustrated in FIG. 6, shows an initially planned route Ra of the hydrogen refuelling vehicle 22 to refuel an object 28a and subsequently to refuel an object 28b. The initial route Ra is shown in dashed lines. If the hydrogen refuelling vehicle 22 requires replenishment of its hydrogen storage at an optimal resupply location 23a and the object 28a is scheduled for refuelling, followed by the object 28b, but the object 28b is closer to the hydrogen refuelling vehicle 22 and/or to the hydrogen supply vehicle 24, the schedule may be updated to a new planned route Rb to enable resupply of the hydrogen refuelling vehicle 22, such as at resupply location 23b. Thereafter, the object 28b is refuelled before the object 28a. In this manner, the total time required for resupplying the hydrogen refuelling vehicle 22 as well as refuelling the object 28a and the object 28b is optimised/minimised, e.g. less travel is required.

The information relating to scheduled refuelling operations may further comprise prioritisation data of objects 28 to be refuelled by the hydrogen refuelling vehicle 22. The prioritisation data enables the management system 26 to determine whether the at least two consecutive refuelling operations are allowed to be re-scheduled.

Since some objects, which are scheduled for refuelling, may be higher prioritised than others, the prioritisation data allows such prioritised objects 28 to keep their position among the scheduled refuelling operations even if the total time required for a resupply operation of the hydrogen refuelling vehicle 22, the refuelling operation of the prioritised object 28 and at least one subsequent refuelling operation would be reduced if the refuelling operations were re-scheduled. In this manner it is ensured that prioritised objects are not required to wait longer than necessary for refuelling.

The management system 26, comprising the processing device 27 and the communications device 29, may be physically separately located from each vehicle involved in the method 10, such as being located in a central fixed location. Alternatively, the management system 26 may be located in one of the vehicles, such as in a hydrogen refuelling vehicle 22 serviced by one or more hydrogen supply vehicles 24.

To carry out the method 10 according to the first aspect of the disclosure, there may be provided a computer program product 30 (FIG. 2) comprising program code for performing the method 10 when the program 30 is run on the processor device 27 of the management system 26.

Further, there may be provided a non-transitory computer-readable storage medium 32 (FIG. 2) comprising instructions, which when executed by the processor device 27 of the management system 26, causes the processor device 27 to perform the method according to any one of the embodiments of the first aspect of the disclosure. The storage medium 32 may be comprised in the management system 26, or it may be comprised in a cloud or network storage arrangement which may be wirelessly connected to the management system 26. The map data may be comprised on the storage medium 32. The map data may further be complemented by real-time map data, such as current traffic status, weather, etc.

The invention claimed is:

1. A computer-implemented method for managing a mobile hydrogen refuelling system, the mobile hydrogen refuelling system comprising a hydrogen refuelling vehicle, a hydrogen supply vehicle, and a management system, wherein the method comprises:

in the management system, obtaining from the hydrogen refuelling vehicle a first set of data relating to the hydrogen refuelling vehicle, in the management system, obtaining from the hydrogen supply vehicle a second set of data relating to the hydrogen supply vehicle, in the management system, obtaining map data relating to an area of operation of said hydrogen refuelling vehicle and said hydrogen supply vehicle, in the management system, determining a resupply location based on said first set of data, said second set of data and said map data, and in the management system, providing the hydrogen refuelling vehicle and/or the hydrogen supply vehicle with navigation instructions to the resupply location for resupplying the hydrogen refuelling vehicle with hydrogen from the hydrogen supply vehicle, and wherein the first set of data further comprises information relating to scheduled refuelling operations of the hydrogen refuelling vehicle for refuelling at least one object, and wherein the information relating to scheduled refuelling operations of the hydrogen refuelling vehicle for refuelling the at least one object comprises predicted location, time required for refuelling, and/or predicted amount of hydrogen fuel of at least one object to be refueled by the hydrogen refuelling vehicle.

2. The method according to claim 1, wherein the resupply location is determined as the location requiring the shortest time to resupply the hydrogen refuelling vehicle, out of available resupply locations obtained from said map data.

3. The method according to claim 1, wherein the first set of data comprises information relating to location, predicted time for required resupply, travelling path, and/or amount of required hydrogen of the hydrogen refuelling vehicle.

4. The method according to claim 1, wherein the second set of data comprises information relating to location and/or hydrogen level of the hydrogen supply vehicle.

5. The method according to claim 1, wherein the method further comprises, in the management system, updating the information relating to scheduled refuelling operations such that refuelling operations are re-scheduled to provide a resupply location which reduces a total time required for resupplying the hydrogen refuelling vehicle and for performing at least two consecutive refuelling operations according to the re-scheduled refuelling operations, as compared to the total time required for resupplying the hydrogen refuelling vehicle and for performing the originally scheduled refuelling operations.

6. The method according to claim 5, wherein the information relating to scheduled refuelling operations comprises prioritisation data of objects to be refuelled by the hydrogen refuelling vehicle, which prioritisation data enables the management system to determine whether the at least two consecutive refuelling operations are allowed to be re-scheduled.

7. A management system for controlling a mobile hydrogen refuelling system, the management system comprising a processor device and a communications device configured to perform the method according to claim 1.

8. A mobile hydrogen refuelling system for resupplying a hydrogen refuelling vehicle, the mobile hydrogen refuelling system comprising at least one hydrogen refuelling vehicle, at least one hydrogen supply vehicle, and the management system according to claim 7.

9. The mobile hydrogen refuelling system according to claim 8, wherein the hydrogen refuelling vehicle is configured to communicate the first set of data to the management system, wherein the hydrogen supply vehicle is configured to communicate the second set of data to the management system, and wherein the management system is configured to provide the hydrogen refuelling vehicle and/or the hydrogen supply vehicle with navigation instructions to the resupply location for resupplying the hydrogen refuelling vehicle with hydrogen from the hydrogen supply vehicle.

10. The mobile hydrogen refuelling system according to claim 8, wherein the hydrogen refuelling vehicle and the hydrogen supply vehicle comprise onboard navigation units, monitoring units and/or communication units configured to collect and communicate the first set of data and the second set of data, respectively and to receive the navigation instructions to the resupply location for resupplying the hydrogen refuelling vehicle with hydrogen from the hydrogen supply vehicle.

11. The mobile hydrogen refuelling system according to claim 8, further comprising a predetermined set of objects scheduled to be refueled by the hydrogen refuelling vehicle.

12. A computer program product comprising program code for performing the method of claim 1.

13. A non-transitory computer-readable storage medium comprising instructions, which when executed by a processor device of a management system, cause the processor device to perform the method of claim 1.

* * * * *